Aug. 7, 1962   A. R. VAN CORTLANDT WARRINGTON   3,048,744
ELECTRICAL PROTECTIVE RELAY SYSTEMS
Filed July 11, 1957                           3 Sheets-Sheet 1

Aug. 7, 1962   A. R. VAN CORTLANDT WARRINGTON   3,048,744
ELECTRICAL PROTECTIVE RELAY SYSTEMS

Filed July 11, 1957                               3 Sheets-Sheet 2

Inventor:
Albert Russell van Cortlandt Warrington
By: Stevens, Davis, Miller & Mosher
Attorneys United States Patent Office 3,048,744
Patented Aug. 7, 1962

3,048,744
ELECTRICAL PROTECTIVE RELAY SYSTEMS
Albert Russell van Cortlandt Warrington, Stafford, England, assignor to The English Electric Company Limited, London, England, a British company
Filed July 11, 1957, Ser. No. 671,193
Claims priority, application Great Britain Aug. 25, 1953
4 Claims. (Cl. 317—27)

The present patent application is a continuation in part of the patent application Serial No. 442,825 of Albert Russell van Cortlandt Warrington, assignor to The English Electric Company Limited, filed on July 12, 1954, and now Patent No. 2,912,622.

This invention relates to electrical protective relay systems, and is particularly concerned with the use of transistors in such systems.

It is the object of the invention to provide an improved relay of the kind in which two conditions have to be satisfied before the relay operates, as for example, in one form of a directional impedance relay where one condition is that power is flowing in a particular direction along a protected line and the other condition is that the line impedance is lower than a predetermined value.

In the past such relay systems have incorporated mechanical contactor devices individually responsive to the different conditions or have had a well-known induction type construction. Such systems suffer from the disadvantage that they have moving parts and it is desirable to overcome this disadvantage by replacing them by static relay systems.

Static relays utilise devices such as electronic tubes, transductors, and transistors but progress in developing these relays is slow. Circuits involving such devices are subject to subsidiary influences such as bias potentials and are likely to be unreliable unless there are special safeguards. Furthermore, transductors are expensive, whereas electronic and transistor circuits tend to be complicated, both of which are undesirable commercial features. Thus, although there is a great need for static relays, this need can only be met satisfactorily if the relay is simple and yet reliable. It has been found that the desirable simplification of static relay design can be obtained by applying the invention now to be described.

According to the invention, a relative polarity detector for an electrical protective relay system including means for generating two signals of variable relative instantaneous polarity comprises two transistors connected to have the collector of one said transistor in series with the emitter of said other transistor, input terminals arranged for applying one said signal to the base of one said transistor and the other said signal to the base of the other said transistor and output terminals arranged to supply an output signal from said detector indicative of its conductive condition.

The invention finds application in systems working on the phase comparison principle or on the amplitude comparison principle and various features of the invention relate to specific circuit arrangements some of which are peculiar to systems working on a particular one of these principles.

A feature of the invention which may find application in relay systems working on either principle requires that the relay system should further comprise time delay means connected between the relative polarity detector and the relay means and operative to ensure that the system will only operate to open the circuit interrupter means provided the said combination of polarities as between the generated signals is sustained for a period determined by the character of said time delay means.

The invention will now be fully described with reference to the accompanying drawings in which.

Figure 3:
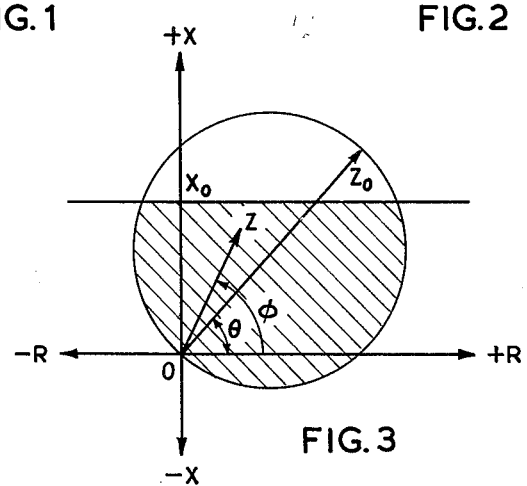
Figure 4:
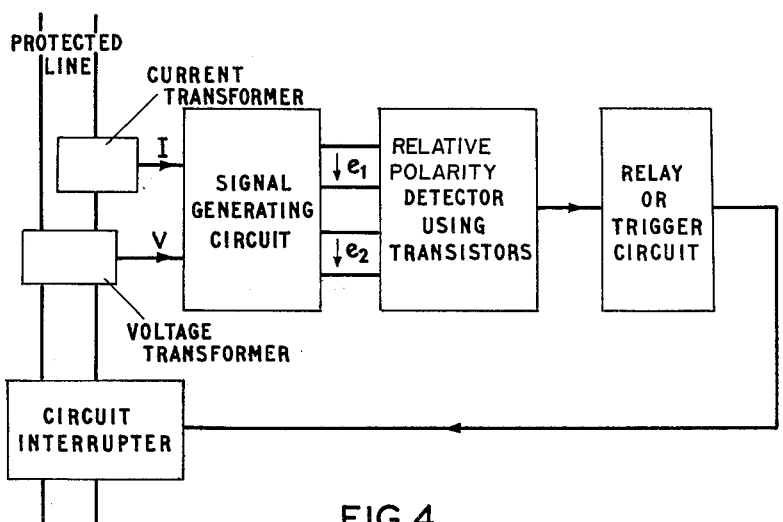
Figure 5:
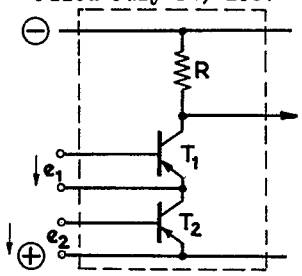
Figure 6:
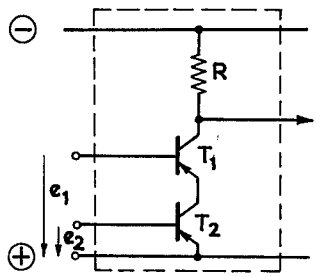
Figure 7:
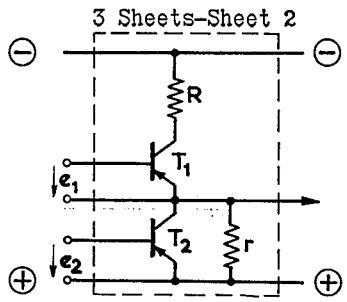
Figure 8:
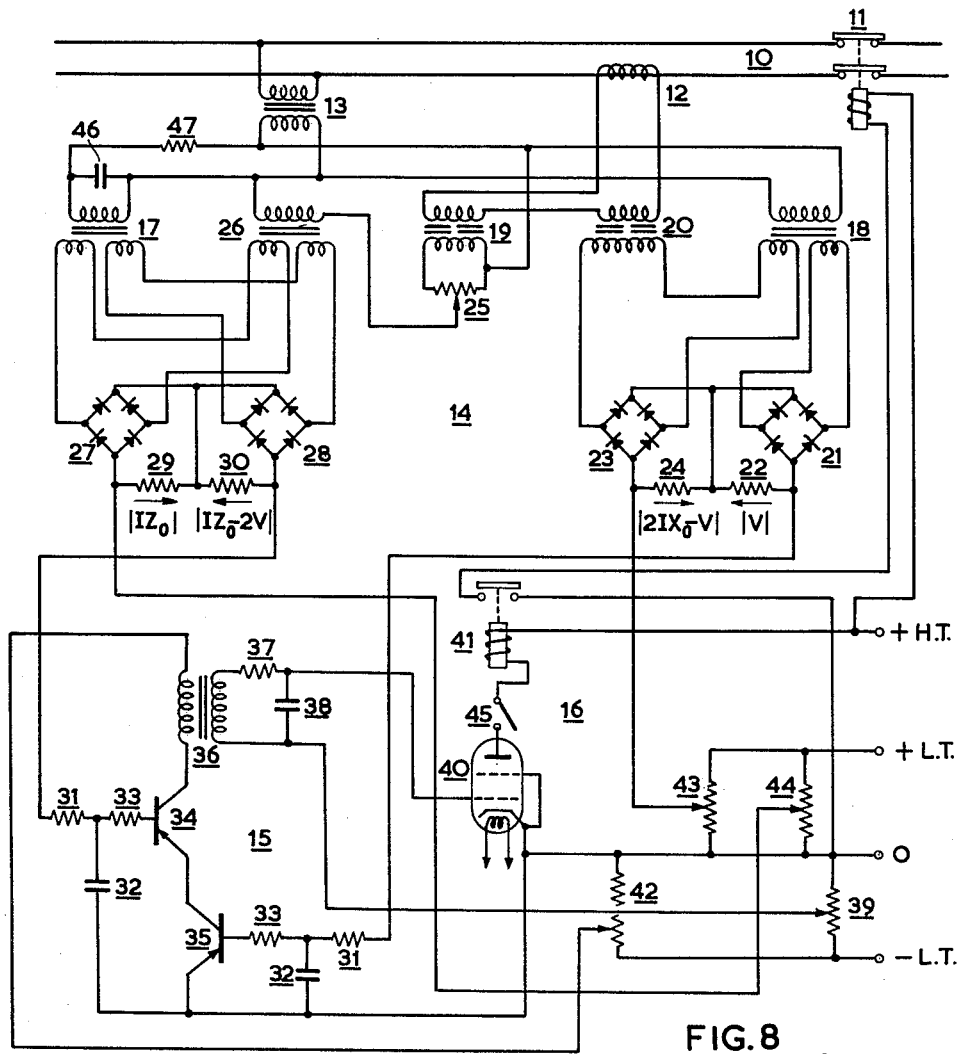
Figure 9:
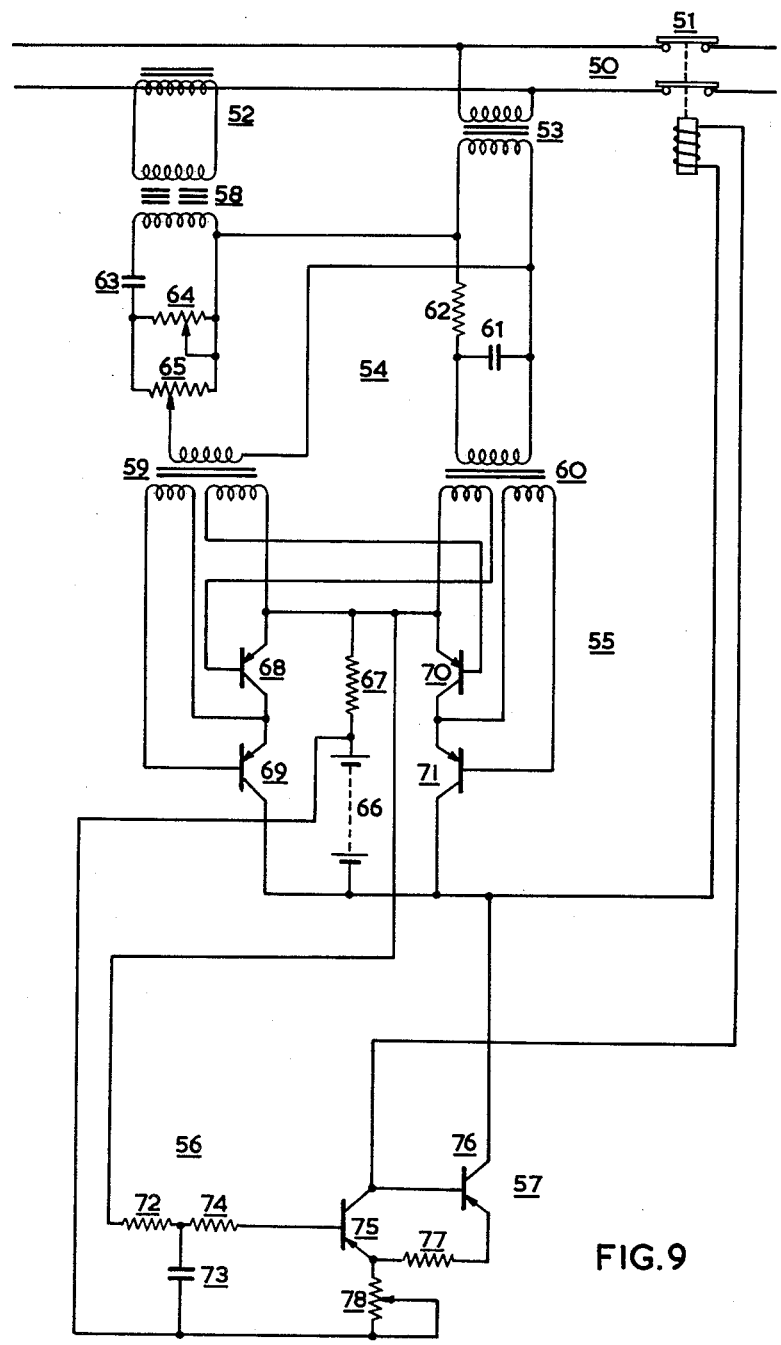

FIG. 3 shows a relay operating characteristic applicable to a reactance type distance relay, FIG. 4 shows in block schematic form a general arrangement of a relay system according to the invention, FIGS. 5, 6 and 7 show alternative arrangements of transistor relative polarity detectors which may be used in the system shown in FIG. 4, FIG. 8 shows a detailed single phase relay system using amplitude comparison and incorporating a time delay device between the relative polarity detecting circuit and the trigger stage, and, FIG. 9 shows a detailed single phase relay system using phase comparison and incorporating an integrating device between the relative polarity detecting circuit and the trigger stage.

Figure 1:
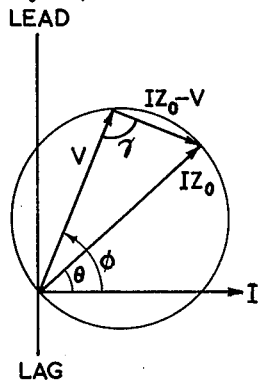
FIG. 1 shows an operating characteristic applicable to a directional impedance type distance relay. This characteristic is that of a "mho unit" which signifies a relay which operates only when the impedance of the protected line falls below a predetermined value.

In FIG. 1 a typical relay operating characteristic is shown. Signals denoted I and V respectively and representing the current and voltage respectively of a single phase protected line are used to derive quantities V and $IZ_0-V$. In FIG. 1 the current vector I is taken as the reference vector. The vector V is shown to lead the current I by an angle $\phi$. $Z_0$ is a characteristic impedance of the relay and $\theta$ is an angle applicable to this impedance and represents the angle by which $IZ_0$ leads I. The vector $IZ_0-V$ is the vector difference between $IZ_0$ and V and is shown to lag behind V by an angle $\gamma$. It is supposed that the criterion for relay operation is that $\gamma$ should exceed 90°. The relay characteristic is the locus of V when the relay is upon the threshold of operation. This is when the angle $\gamma$ is equal to 90° and the geometry of FIG. 1 shows that this locus is a circle of diameter $IZ_0$. When the angle $\gamma$ is less than 90° the vector V extends outside the circle. Relay operation, which corresponds to $\gamma$ being greater than 90° occurs when the vector V lies wholly within the circle. This corresponds to the condition that $|V|$ should be less than $$|IZ_0| \cos (\phi - \theta)$$

This is the characteristic of a "mho" relay.

Figure 2:
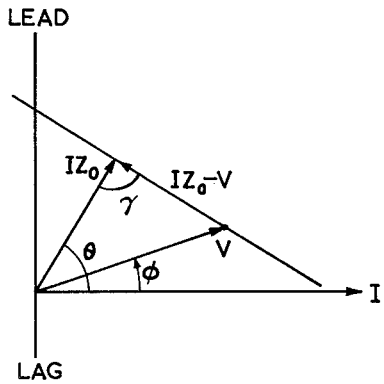
FIG. 2 shows a relay operating characteristic applicable to a directional reactance relay.

Another form of relay has a characteristic such as that shown in FIG. 2. Here the operating criterion is that the phase angle $\gamma$, this time between $IZ_0$ and $IZ_0-V$, should be less than 90°. Again, $\theta$ is the phase angle between $IZ_0$ and I. The locus of the operating characteristic in this case is a straight line at right angles to $IZ_0$. Relay operation occurs when $|V| \cos (\theta - \phi)$ becomes less than $|IZ_0|$. Denoting the ratio $|V|/|I|,Z$, this condition is that $Z \cos (\theta - \phi)$ is less that $|Z_0|$. If $\theta$ is equal to 90° the characteristic is that of a directional reactance relay, whereas if $\theta$ is equal to a zero the relay operates subject to power flow in the appropriate direction when the resistance of the protected line falls below a predetermined value.

These considerations illustrate how a phase angle comparator can be applied in relays having diverse operating characteristics. It is also to be noted that a similar treatment can be applied to a comparison between two currents as, for example, in the differential protection of generators and transformers etc., similar circular locus characteristics can be applied in relays utilising such comparisons.

A relative polarity detector can be used in conjunction with an integrating or time delay device to function as a phase angle comparator. The phase angle measurement is a matter of detecting when two compared alternating signals both have positive polarity. The fraction of a cycle during which this particular polarity combination exists is a measure of the phase angle between the two signals.

The phase comparison principle can be used with relay systems required to operate within a very short time of fault occurrence. Where a lower operating speed can be tolerated the amplitude comparison principle is often used. A phase comparison can give the relay system a direction sensing feature if required; there is no need to perform some indepedent comparison. Where electromagnetic relays are used this is remedied using a basic unit having the appropriate characteristic and a special directional unit. Accordingly, two amplitude comparisons are made so that two parameters can be retained in the determination of relay operation. In a special application in which the basic unit is a reactance type distance relay the directional unit may comprise a mho relay. In this case signals representing the moduli of $IZ_0$ and $IZ_0-2V$ are compared to produce a D.C. signal given by $|IZ_0|-|IZ_0-2V|$.

A further amplitude comparison is also made between signals representing the moduli of a V and $2IX_0-V$, where $X_0$ is a characteristic reactance setting of the relay. It is then necessary to consider the condition arising when $|2IX_0-V|-|V|$ is on the threshold of zero. It may be shown by analysis that if Z denotes the ratio $|V|/|I|$ and $\theta$ is a measure of an angle of lead applicable to a vector representation of Z, whilst $\phi$ is the angle by which V leads I, the two comparisons just considered require that Z should be less than $Z_0 \cos(\theta-\phi)$ and that $X_0$ should be greater than $Z \sin \phi$. The vector diagram applicable here is that shown in FIG. 3. Relay operation occurs when two conditions are satisfied simultaneously. The first of these conditions is that the vector Z should fall wholly within a circle of diameter $Z_0$ as shown in the figure, whilst the second of these conditions requires that Z should not extend beyond a line of constant reactance $X_0$. This means that relay operation will occur when the vector Z representing the impedance of the protected line, falls wholly within the area that is shaded in FIG. 3. It is to be noted that the operating characteristic of the relay is in this case presented on an impedance diagram. As relay operation requires the determination of the condition that two D.C. signals should be positive simultaneously, the amplitude comparison principle requires a polarity coincidence detector.

One way of combining the action of such signals is to cause each to energize a polarized coil-operated contact system. By having the contacts of the two contact systems connected in series in a trip circuit of a circuit interrupter the operating characteristic of the system requires that both signals shall be simultaneously positive for relay operation to occur. This invention provides that a transistor system should be used as the relative polarity detector which determines relay operation. As in the phase comparison case, it is desirable to provide a time delay device between the relative polarity detector and the relay or trigger device but for a different reason. Where it is required to compare the amplitudes of alternating signals regardless of their phase relationship it becomes necessary to rectify and smooth at least one of them before effecting a comparison. Such a smoothing action of necessity introduces a time delay in operation where the amplitude of the rectified signal is changing rapidly. The function of the relay system is to generate two D.C. signals according to the required operating characteristic of the relay and to promote relay operation when both of these signals have a particular polarity combination; for example, when both signals are simultaneously positive the relative polarity detector detects when this polarity combination exists and the relay or trigger device responds to this detection to promote relay operation. If the trigger function is performed by the relative polarity detector, as it would be if a two grid gas discharge tube were used with the D.C. control signals applied to different grids, faulty operation might occur. It may happen in the event of a fault condition that the polarities of the signals interchange suddenly. This should not lead to relay operation but it might if, owing to signal smoothing, the polarity change of one of the signals is retarded with respect to that of the other. If, for example, a non-fault current is flowing in the relay operating direction, one of the signals will, say, be positive and the other will be negative. Now, imagine a fault to occur which causes power to flow in the non-relay-operating direction. The polarities of both signals must reverse simultaneously to avoid faulty relay operation, yet the chances are that one will change polarity before the other. Accordingly, it is desirable that the relay should only operate if the relay-operating polarity coincidence is sustained for a small but definite period. A time-delay device connected between the relative polarity detector and the relay or trigger device can serve such a function. Besides this, the time delay can serve a useful function in eliminating faulty operation as a result of the occurrence of spurious pulses which might occur in a sensitive electronic circuit. Such a pulse could bring about relay operation by momentarily rendering one of the transistors conductive. The use of a time delay connection between the relative polarity detector and the trigger device or relay is not therefore limited to amplitude comparison systems or to phase comparison systems which use the time delay connection as the means for integrating the duration of signal polarity coincidence.

Another problem encountered in protective relay systems arises from the D.C. offset which might distort one of the compared signals. This is likely to upset a phase comparison unless special compensating circuits are used. Alternatively, a time delay might be introduced into the system in order to prevent relay operation in response to short duration D.C. offset effects.

The invention is concerned with the use of transistors in a relative polarity detecting device. The object of the invention is to provide an improvement in a relay system by rendering it "static," that is, by eliminating moving parts such as electromagnetically-operated relay devices. A problem facing the replacement of mechanical components by electronic components is that the inherent inertial effects of the mechanical system are no longer present, and though this does enable the development of faster-operating relay systems it also renders them sensitive to spurious effects. The tendency has therefore been to screen electronic tubes from magnetic and electrical pick-up signals when they are used in protective relay systems. In this way it has been feasible to propose that a grid-controlled gas-discharge tube could be used to trigger relay operation in response to two different grid signals applied to different grids of the valve. It has been found that the functions of the signal comparison and triggering are best separated, preferably by a time-delay device. Furthermore, in the interests of reliability the use of transistors is highly desirable. Transistors are not subject to the spurious signals which might be supplied from heater supplies; transistors have no heaters.

In FIG. 4 a protective relay system is shown schematically to comprise a protected line, a circuit interrupter connected in the line, current and voltage transformers energized by the line, a signal generating circuit controlled in response to a current signal I and a voltage signal V derived from the current and the voltage transformers respectively, a relative polarity detector responsive to the polarities of two output signals supplied by the signal generating circuit, and a relay or trigger circuit controlled by the relative polarity detector and operative to open the circuit interrupter when the input signals to the relative polarity detector have a particular polarity combination. These latter input signals are denoted in FIG. 4 $e_1$ and $e_2$ respectively. From the foregoing description it will be evident how a relay system of the kind shown in FIG. 4 can be applied to perform a protective function. The mode of operation of the system and the relay characteristic depends upon the nature of the signal generating circuit. If the system works on the phase comparison principle the signals $e_1$ and $e_2$ will be alternating signals and the relative polarity detector will function to determine the fraction of a cycle during which $e_1$ and $e_2$ have, say, positive polarity, whilst the relay or trigger circuit will require to operate in response to the duration of the polarity coincidence detection rather than its actual occurrence. If the system works on the amplitude comparison principle then $e_1$ and $e_2$ will be D.C. signals and the requisite condition of polarity coincidence will be required to initiate relay operation.

Detailed examples of systems working on the amplitude comparison principle and the phase comparison principle will be presented with reference to FIGS. 8 and 9, but before doing this the nature of the relative polarity detector shown in FIG. 4 will be considered.

The invention provides that this relative polarity detector shall comprise two transistors which are connected to provide a circuit whose conductive condition depends upon two control signals applied respectively to the different transistors. Typical examples of transistor relative polarity detectors are shown in FIGS. 5, 6 and 7 respectively.

In FIG. 5 two transistors are shown to have their collector emitter circuits connected directly in series. Thus the transistor $T_1$ is shown to have its emitter connected to the collector of transistor $T_2$. The emitter of $T_2$ is connected to a positive voltage supply and the collector of $T_1$ is connected through a resistor R to a negative voltage supply. The voltage across the resistor R constitutes the output signal from the detector. Input signals $e_1$ and $e_2$ are applied between the base and emitter of the transistors $T_1$ and $T_2$ respectively. In operation, transistor $T_1$ is rendered conductive only when the signal $e_1$ has a polarity which causes the base of the transistor to be negative with respect to the emitter. Neglecting the minor effect of the bias, $T_1$ is therefore rendered conductive when $e_1$ has negative polarity. Similarly $T_2$ is rendered conductive when $e_2$ has negative polarity and the series combination of $T_1$ and $T_2$ is conductive only when both $e_1$ and $e_2$ are simultaneously negative. It is to be understood that it is merely a matter of the circuit connections of the input signals $e_1$ and $e_2$ to arrange that the transistor combination is conductive when, and only when, a particularly polarity combination exists as between the two signals $e_1$ and $e_2$. On the basis of the sign convention evident from FIG. 5 the conductive condition occurs when $e_1$ and $e_2$ are simultaneously negative. Under these conditions the potential drop across the resistor R is large and the detector affords an output signal.

The circuit of FIG. 5 can be modified slightly as shown in FIG. 6 so that the signal $e_1$ is applied between the base of transistor $T_1$ and the emitter of transistor $T_2$. This may in some cases provide a more convenient arrangement because it affords a common reference for the two input signals. It will, of course, be desirable to ensure that $e_1$ is normally stronger than $e_2$ or, alternatively, to provide large resistors in the base circuits of each transistor.

Just as it is possible to interchange the input connections to the detector so as to provide a detection of any chosen particular combination of input signal polarities, it is also possible to modify the output circuit of the detector as shown, for example, in FIG. 7. Here the output signal is derived from a resistor $r$ connected between the collector and emitter of transistor $T_2$. The advantage here is that the output signal is referred to the positive voltage source rather than the negative voltage source. In operation, an output signal arises only when the transistor $T_1$ is conductive at the same time that the transistor $T_2$ is non-conductive. On the basis of the sign convention adopted in FIG. 7 this corresponds to the condition that $e_1$ should be negative at the same that $e_2$ is positive. However, by interchanging the connections of one or both signals $e_1$ and $e_2$ any polarity combination between the signals can be selected as the one detected by the detector.

FIG. 8 shows a detailed single phase version of a relay system using amplitude comparison and incorporating a time delay device between the relative polarity detecting circuit and the trigger stage. The circuit shown here is much the same as that disclosed in the patent application Serial No. 442,825. The components corresponding to those of the system shown in FIG. 4 are the single phase protected line 10, the circuit interrupter 11, the current transformer 12, the voltage transformer 13, the signal generating circuit 14, the relative polarity detector 15 and the combined trigger and relay unit 16.

The relay system has an operating characteristic of the form represented in FIG. 3. Relay operation is determined by two amplitude comparisons. The function of the circuit 14 is to generate two D.C. signals whose polarity indicates the result of a particular amplitude comparison. In the circuit 14 the voltage output signal from the transformer 13 is applied to energise two transformers 17 and 18 respectively. The current signal from the transformer 12 energises two transactors 19 and 20. These transactors have series connected primary windings. They are transformers having an air gap in their magnetic cores. The effect of this is that the signals supplied from their secondary windings are voltage signals which are a measure of the energising current in their primaries. Considering first the output signals from transformer 18 and transactor 20, it is to be noted that these signals are combined to produce an output signal which can be expressed mathematically in the form $$|2IX_0-V|-|V|$$

To produce such a signal it is first necessary to generate an A.C. signal representing $2IX_0-V$ and to rectify this signal before comparing it with a rectified version of the signal V. Thus in FIG. 8 the transformer 18 is shown to have two identical secondary windings. The ratio of the transformer 18 will be such that each winding produces an output signal V. The output from one such winding is supplied directly to a full-wave bridge rectifier 21, and the output from this rectifier is connected to a resistor 22. As a result of this a potential drop is set up across the resistor 22 in the direction indicated by the arrow. This potential drop has a magnitude equal to the full-wave rectified version of the signal V. The mean amplitude of this signal is proportional to $|V|$. It is to be noted that $|V|$ is the amplitude of the signal V and if V is measured as an R.M.S. quantity the mean value of the potential drop across resistor 22 will equal $|V|$ multiplied by $2\sqrt{2}/\pi$. The voltage output signal from the transactor 20 is related to the current input signal by the factor $2X_0$ which has the dimensions of a reactance. The secondary winding of the transactor 20 is connected in series opposition with the other secondary winding of transformer 18 and the combined output signal $2IX_0-V$ from this combined circuit is rectified by the bridge rectifier 23 before being supplied to the output resistor 24. The connections are such that the potential drop in the resistor 24 is in the direction shown by the arrow. This potential drop has a mean magnitude proportional to $|2IX_0-V|$. Resistors 22 and 24 have a common connection so that the total potential drop across them is $|2IX_0-V|-|V|$. The polarity of the D.C. component of this signal is indicative of the result of one of the amplitude comparisons effected by the circuit 14. The other part of the circuit 14 is concerned with the other amplitude comparison.

This part of the circuit is complicated somewhat by the provision of a memory action feature. A resistor 25 is connected across the output from the transactor 19.

The character of the transactor 19 is such as to produce an output signal which is related to the line current by a factor $Z_0$ which is a complex quantity and such as to cause the output voltage from the transactor 19 to lead the input current by the angle $\theta$. A movable tapping on the resistor 25 enables an adjustable proportion of this output signal $IZ_0$ to be derived and this is biased against the voltage output signal from the transformer 13 and applied to energise the transformer 26. Thus, for the purpose of this description the output signals derived from the two identical secondary windings on transformer 26 may be supposed to be given by $IZ_0-V$ where $Z_0$ can be controlled by adjusting the tapping on resistor 25. The transformer 17 has two identical secondary windings and these are the source of signals of strength V. The secondary windings of transformers 17 and 26 are paired off and connected in series to produce signals which comprise $IZ_0-V$ as supplied from transformer 26 $+V$ as supplied from transformer 17 and $IZ_0-V$ as supplied from transformer 26 $-V$ as supplied from transformer 17. These generated signals are each supplied through a bridge rectifier 27 or 28 to produce a D.C. signal in a resistor 29 or 30, the directions of current flow in the resistors being as indicated by the arrow in the figure. Provided the voltage signal supplied by transformer 17 is equal to the voltage component of the signal supplied by transformer 26 the mean values of the currents in the resistors 29 and 30 are $|IZ_0|$ and $|IZ_0-2V|$ respectively. Resistors 29 and 30 together therefore comprise a source for a D.C. signal whose mean strength is $|IZ_0|-|IZ_0-2V|$ and the polarity of this signal is representative of the result of the amplitude comparison effected by this particular part of the circuit 14.

It has been shown with reference to FIG. 3 how a polarity coincidence as between the output signals from the circuit 14 can produce the necessary relay characteristic. It remains therefore to smooth the output signals from resistors 22 and 24 and resistors 29 and 30 before making the polarity comparison. Accordingly the output signals from the circuit 14 are fed to resistor capacitor circuits each comprising a resistor 31 and a capacitor 32 and the signals derived from the capacitor 32 are supplied through the base resistors 33 to the bases of transistors 34 and 35 respectively. These transistors are connected and energised in the manner indicated in FIG. 6. The load resistor of FIG. 6 is, however, replaced by the primary winding of a coupling transformer 36. A resistor capacitor circuit comprising resistor 37 and capacitor 38 is connected across the secondary winding of the transformer 36 and the potential drop across this capacitor is supplied, subject to a negative bias signal derived from a potentiometer 39, to the control grid of a gas discharge tube 40.

This gas discharge tube 40 forms part of the relay and trigger circuit 16. The anode circuit of the tube includes the operating coil of a relay 41 whose contacts are connected in the drip circuit of the circuit interrupter 11.

In the system shown in FIG. 8 suitable voltage supplies are shown. The negative voltage supply for the transistor circuit is derived from a potentiometer 42 and bias means comprising potentiometers 43 and 44 are applied to bias the signals supplied to the bases of the transistors so that these transistors respond exactly to the polarities of the signals generated in the circuit 14. A switch 45 is shown in the anode circuit of the tube 40. The function of this switch is to enable the anode circuit to be interrupted to terminate discharge in the tube 40 and so enable the relay system to be reset.

In operation, the potentiometers 43 and 44 are set so that with zero output signals from the circuit 14 the transistors 34 and 35 are each on the threshold between a conductive and non-conductive condition. In the event that the base of each transistor 34 and 35 is driven negative simultaneously a voltage suddenly appears across the primary winding of transformer 36. By transformer action this produces a sudden voltage on the secondary winding of the transformer and as this winding is so connected to the control grid of the tube 40 that when transistors 34 and 35 become simultaneously conductive a positive grid signal is applied to the tube this condition is able to initiate gas discharge in the tube 40 which energises relay 41, closes the trip circuit of the circuit interrupter 11 and breaks the current flow in the protected line 10.

It has been explained how owing to the smoothing action of a circuit such as that comprising resistor 31 and capacitor 32 a faulty relay operation can occur unless some time delay is provided between the coincidence detector and the trigger stage. Depending upon the circuit design the magnetic character of the core of transformer 36 may provide sufficient time delay effects to safeguard against faulty operation. However, in FIG. 8 special provision is made by the inclusion of the resistor 37 and the capacitor 38. The result is that sufficient grid voltage will only be supplied to the tube 40 if the simultaneous conductive condition of the transistors 34 and 35 is sustained for a sufficient period. In a modification of the circuit shown in FIG. 8 the transformer 36 can be replaced by a resistor connected directly to the circuit comprising resistor 37 and capacitor 38.

It has been noted in the generation of the signals in the circuit 14 that at one stage a voltage signal is added from a combined current and voltage signal to eliminate the voltage signal. This would seem to make part of the circuit redundant. However, it is further noted that a capacitor 46 is connected across the primary winding of transformer 17. The function of this capacitor is to provide a resonant circuit with the primary of transformer 17 which retains for some time a voltage energisation of the transformer even though the line voltage at the transformer 13 may fall appreciably on a close in fault. Resistor 47 prevents a too rapid dissipation of energy from this resonant circuit. In the event of such a close in fault the cancellation of the voltage signals as between the combined outputs from transformers 17 and 26 no longer occurs. Instead the signals supplied to the bridge rectifiers tend to assume the form $IZ_0-V$ and $IZ_0+V$ respectively where V represents the line voltage some moments previously. It may be shown that with this arrangement the operation of the relay will not be unduly affected by loss of line voltage. Furthermore the relay characteristic is not appreciably altered.

The circuit shown in FIG. 9 represents in detail a phase comparison relay system. It comprises a protected line 50, a circuit interrupter 51 connected in the line 50, current and voltage transformers 52 and 53 energised by the line, a signal generating circuit 54, a polarity coincidence detecting circuit 55, a smoothing circuit 56, and a trigger circuit 57.

The signal generating circuit 54 includes a transactor 58 and two transformers 59 and 60. The primary winding of transformer 60 is energised directly from transformer 53 but to safeguard against loss of line voltage caused by line faults close to the relay a capacitor 61 is connected across the primary winding of transformer 60 to form a resonant circuit which is tuned to the frequency of the protected line 50. In the event of a short circuit on the line 50 close to the transformer 53 the resonant circuit as able to supply the energy necessary to polarise the relay since, regardless of its amplitude, the primary voltage retains the necessary phase relationship for simulating the line voltage for a few cycles after the occurrence of a fault. A resistor 62 connected between transformer 53 and transformer 60 prevents the resonant circuit from losing its energy too rapidly when the input signal falls. The transformer 60 has two identical secondary windings which provide independent equal signals of opposite polarity and proportional to the line voltage V.

Transactor 58 is energised directly from the current transformer 52. Its secondary winding energises a circuit comprising a capacitor 63 and a variable resistor 64. By varying the resistor 64 the potential drop across the resistor can be caused to have an adjustable phase with respect to the current in the line 50. The potential drop across resistor 64 is applied across the ends of a tapped potentiometer 65 and the signal appearing between one end of this potentiometer and the tapping is added to the voltage signal supplied by the transformer 53 before being supplied as input to the primary winding of the transformer 59. By adjusting the tapping on the potentiometer 65 the strength of the signal supplied by resistor 64 can be matched to that supplied by transformer 53 to cause the energising signal of the transformer 59 to have the form $IZ_0-V$ where I is the line current and $Z_0$ is a characteristic impedance setting. The transformer 59 has two identical secondary windings which supply signals $IZ_0-V$ of equal strength but opposite polarity.

The polarity coincidence detecting circuit 55 comprises a source of voltage represented by a battery 66, a load resistor 67 and connected in parallel with each other and in series with the load resistor 67, two pairs of series connected transistors. The transistors in the figure are denoted 68, 69, 70 and 71 respectively. A transistor of each pair is controlled in accordance with an output signal from the transformer 59 and the other transistor of the pair is controlled in accordance with an output signal from the transformer 60. The arrangement is such that one pair of transistors 68 and 69 has simultaneously positive base potentials whilst the other pair 70 and 71 is experiencing simultaneously negative base potentials. In the event of the presence of D.C. offset in one of the input signals to the transformers 59 and 60 the periods during which the different pairs of transistors are simultaneously conductive will become different. However, owing to the arrangement of the circuit the total period will be independent of the D.C. offset and will be determined solely by the phase relationship between the compared signals. As will be understood from a consideration of the varying principles, the mean current in the load resistor 67 is a measure of the phase difference between the compared signals.

A signal proportional to this mean current is supplied to the circuit 56. This circuit comprises a resistor 72 and a capacitor 73. The smoothed signal appearing across the capacitor 73 is fed through a base resistor 74 to the base of a transistor 75 in the trigger circuit 57. The emitter of a second transistor 76 is connected through a resistor 77 to the emitter of transistor 75, whilst the base of transistor 76 is supplied directly from the collector of transistor 75. An emitter resistance provided by resistor 78 is connected to a terminal of the capacitor 73 and the positive terminal of battery 66. The circuit is completed by connection from the collector of transistor 75 through the trip circuit of circuit interrupter 51 to the negative terminal of the battery 66.

In operation, with a low input signal to the base of 75, the collector voltage of 75 is close to the negative supply voltage. As a result 76 is fully conductive and a potential drop is established both in the resistor 77 and the emitter resistance 78. The emitter voltage of 75 is determined by this condition and the setting of the emitter resistance, which is adjustable. Should the input signal applied to the base of 75 exceed the potential drop across the resistance 78, transistor 75 will become conductive. As a result the potential drop across the trip coil of the circuit interrupter 51 will suddenly increase and the current flow through resistor 77 will decrease appreciably thereby increasing the potential difference between the base of transistor 75 and its emitter. The result is a trigger action initiated by a particular input voltage signal and effective to produce a large current flow through the trip circuit of the interrupter 51. By a suitable setting of the resistance 78 this trigger action occurs when a particular phase relationship exists as between the compared signals.

What I claim as my invention and desire to secure by Letters Patent is:

1. An electrical protective relay system comprising, in combination, a protected circuit, means for deriving two electrical signals from said circuit which are respectively proportional to a current condition and a voltage condition of said circuit, a signal generating circuit responsive to these electrical signals and adapted to generate two control signals having polarities which are different functions of the condition of said circuit and at least one of which is a function of both said current condition and said voltage condition, a relative polarity detector responsive to both said generated signals and comprising two transistors having series connected collector-emitter circuits one of which has its base potential controlled in accordance with the polarity of one generated signal and the other of which has its base potential controlled in accordance with the polarity of the other generated signal, relay means responsive to a conductive condition of said relative polarity detector corresponding to a particular combination of signal polarities as between said generated signals, circuit interrupter means connected in said protected circuit and operative in response to the operation of said relay means to interrupt the protected circuit and so perform a protection operation when said combination of signal polarities occurs, and time delay means connected between the relative polarity detector and the relay means and operative to ensure that the system will only operate to open the circuit interrupter means provided the said combination of polarities as between the generated signals is sustained for a period determined by the character of said time delay means.

2. An electrical protective relay system comprising, in combination, a protected circuit, means for deriving two electrical signals from said circuit which are respectively proportional to a current condition and a voltage condition of said circuit, a signal generating circuit responsive to these electrical signals and adapted to generate two control signals having polarities which are different functions of the condition of said circuit and at least one of which is a function of both said current condition and said voltage condition, a relative polarity detector responsive to both said generated signals and comprising two transistors having series connected collector-emitter circuits one of which has its base potential controlled in accordance with the polarity of one generated signal and the other of which has its base potential controlled in accordance with the polarity of the other generated signal, trigger means responsive to a conductive condition of said relative polarity detector corresponding to a particular combination of signal polarities as between said generated signals, circuit interrupter means connected in said protected circuit and operative in response to the operation of said relay means to interrupt the protected circuit and so perform a protection operation when said combination of signal polarities occurs, said two transistors of said relative polarity detector carrying a common current when both transistors are caused by said generated signals to be conductive, said trigger means being adapted so that changes of the protected circuit to a condition which causes both transistors to be conductive gives rise to said common current, said trigger means of said system comprising a unit which operates in response to said common current to operate the circuit interrupter means.

3. For an electrical protective relay system including means for generating two signals of variable relative instantaneous polarity, a relative polarity detector comprising two transistors connected to have the collector of one said transistor in series with the emitter of said other transistor, input terminals arranged for applying one said signal to the base of one said transistor and the other said signal to the base of the other said transistor and output terminals arranged to supply an output signal from said detector indicative of its conductive condition, and time delay means connected to the output terminals of said detector and comprising output terminals, whereby an output signal from said detector indicative of its conductive condition is provided at the output terminals of said time delay means only after the expiration of a time interval.

4. An electrical protective relay system comprising, in combination, a protected circuit, means for deriving two electrical signals from said circuit which are respectively proportional to a current condition and a voltage condition of said circuit, a signal generating circuit responsive to these electrical signals and adapted to generate two control signals having polarities which are different functions of the condition of said circuit and at least one of which is a function of both said current condition and said voltage condition, a relative polarity detector responsive to both said generated signals and comprising two transistors having series connected collector-emitter circuits one of which has its base potential controlled in accordance with the polarity of one generated signal and the other of which has its base potential controlled in accordance with the polarity of the other generated signal, relay means responsive to a conductive condition of said relative polarity detector corresponding to a particular combination of signal polarities as between said generated signals, and circuit interrupter means connected in said protected circuit and operative in response to the operation of said relay means to interrupt the protected circuit and so perform a protection operation when said combination of signal polarities occurs.

References Cited in the file of this patent
UNITED STATES PATENTS

| | | |
|---|---|---|
| 2,404,643 | Livingston | July 23, 1946 |
| 2,511,680 | Warrington | June 13, 1950 |
| 2,804,578 | Bergseth | Aug. 27, 1957 |
| 2,912,622 | Warrington | Nov. 10, 1959 |
| 2,973,437 | Bradley | Feb. 28, 1961 |